(12) United States Patent
Xiong et al.

(10) Patent No.: US 11,665,158 B2
(45) Date of Patent: May 30, 2023

(54) WIRELESS SIGNAL AUTHENTICATION VIA BIOMETRIC PATTERN DETECTION

(71) Applicant: Lenovo (Singapore) Pte. Ltd., Singapore (SG)

(72) Inventors: Hong Xiong, Raleigh, NC (US); Song Wang, Cary, NC (US); Jatinder Kumar, Cary, NC (US); Mengnan Wang, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 197 days.

(21) Appl. No.: 16/993,624

(22) Filed: Aug. 14, 2020

(65) Prior Publication Data

US 2022/0052994 A1 Feb. 17, 2022

(51) Int. Cl.
*H04L 9/00* (2022.01)
*H04L 9/40* (2022.01)
*H04W 12/06* (2021.01)
*H04L 5/00* (2006.01)
*H04W 72/0453* (2023.01)
*G06V 40/70* (2022.01)

(52) U.S. Cl.
CPC .......... *H04L 63/0861* (2013.01); *G06V 40/70* (2022.01); *H04L 5/0053* (2013.01); *H04W 12/06* (2013.01); *H04W 72/0453* (2013.01)

(58) Field of Classification Search
CPC .......... H04W 72/0453; H04W 12/06; H04L 5/0053; H04L 63/0861; G06V 40/70
USPC ............................................................ 726/6
See application file for complete search history.

(56) References Cited

U.S. PATENT DOCUMENTS

| | | | |
|---|---|---|---|
| 6,219,793 B1 * | 4/2001 | Li | B60R 25/2018 726/19 |
| 9,560,045 B1 * | 1/2017 | Leblang | H04L 63/0869 |
| 10,311,220 B2 * | 6/2019 | Kasilya Sudarsan | G06F 21/32 |
| 2015/0294097 A1 * | 10/2015 | Ramachandran | G06F 3/04883 726/28 |
| 2017/0223743 A1 * | 8/2017 | Lin | H04L 27/2614 |
| 2018/0068101 A1 * | 3/2018 | Kasilya Sudarsan | G06F 21/36 |
| 2019/0349894 A1 * | 11/2019 | Pai | H04W 72/1247 |

* cited by examiner

*Primary Examiner* — Josnel Jeudy
(74) *Attorney, Agent, or Firm* — Ference & Associates LLC

(57) ABSTRACT

One embodiment provides a method, including: identifying a biometric pattern present in a wireless signal associated with an information handling device; determining, using a processor, whether the biometric pattern corresponds to an authorized biometric pattern; and authenticating, responsive to determining that the biometric pattern corresponds to the authorized biometric pattern, a user of the information handling device. Other aspects are described and claimed.

14 Claims, 4 Drawing Sheets

WIRELESS SIGNAL AUTHENTICATION VIA BIOMETRIC PATTERN DETECTION

BACKGROUND

Individuals frequently utilize their information handling devices ("devices"), for example laptop and/or personal computers, tablet devices, smart phones, and the like, to perform a variety of different tasks. Oftentimes, users need to be authenticated prior to accessing their device or prior to accessing an application on their device. Many methods exists today that may authenticate a user prior to granting them access to desired content (e.g., password authentication, fingerprint identification, voice recognition, retinal and/or iris scan, etc.).

BRIEF SUMMARY

In summary, one aspect provides a method, comprising: identifying a biometric pattern present in a wireless signal associated with an information handling device; determining, using a processor, whether the biometric pattern corresponds to an authorized biometric pattern; and authenticating, responsive to determining that the biometric pattern corresponds to the authorized biometric pattern, a user of the information handling device.

Another aspect provides an information handling device, comprising: a processor; a memory device that stores instructions executable by the processor to: identify a biometric pattern present in a wireless signal associated with the information handling device; determine whether the biometric pattern corresponds to an authorized biometric pattern; and authenticate, responsive to determining that the biometric pattern corresponds to the authorized biometric pattern, a user of the information handling device.

A further aspect provides a product, comprising: a storage device that stores code, the code being executable by a processor and comprising: code that identifies a biometric pattern present in a wireless signal associated with an information handling device; code that determines whether the biometric pattern corresponds to an authorized biometric pattern; and code that authenticates, responsive to determining that the biometric pattern corresponds to the authorized biometric pattern, a user of the information handling device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
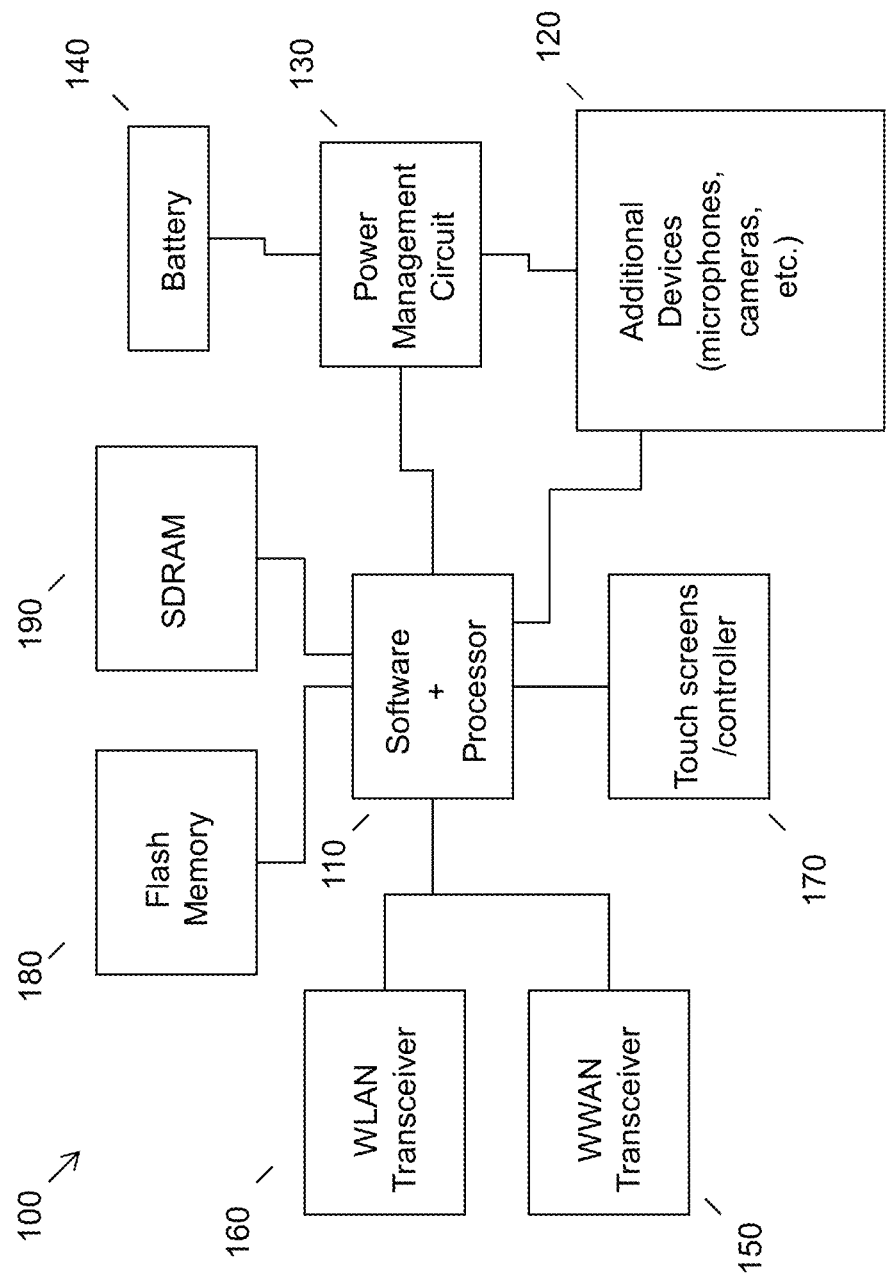
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Electronic devices have become prevalent in modern society. Individuals frequently use and interact with their devices to communicate with others, store information, and perform a variety of different tasks. It is no surprise then that these devices are at a high risk of being hacked. More particularly, it is not uncommon for bad actors to use nefarious means to steal and/or gain access to the large amount of private and/or sensitive information that devices contain.

In an attempt to curb the threat of hacking, many devices employ user authentication systems to confirm that an individual operating the device is an authorized user. These systems often leverage one or more biometric characteristics when conducting their authentication processes. For example, existing authentication systems may be configured to capture certain visual characteristics (e.g., facial features, retinal and/or iris features, etc.), audible characteristics (e.g., vocal tone, vocal pitch, etc.), and/or other biometric characteristics (e.g., heartbeat rate, ambulatory movement information, etc.) of a user. These captured characteristics may then be compared against a set of known characteristics of an authorized user to determine whether the current user is authorized to be operating the device.

The foregoing types of authentication systems usually require dedicated sensing hardware (e.g., cameras, microphones, special sensors and biometric readers, etc.) to perform the authentication processes. Many devices are not equipped with this hardware because it is expensive to obtain and/or implement. Additionally, existing authentication methods are limited due to their dependence upon user behaviors. More particularly, users are generally required to perform one or more actions to provide the relevant biometric data (e.g., users may be required to touch a fingerprint scanner, stare into a camera, audibly recite one or more words or phrases, etc.). These prerequisites may slow down the authentication process and may make it burdensome for the user to interact with the device.

Accordingly, a non-invasive, continuous authentication system is provided that leverages the unique biometric characteristics of users. In an embodiment, a biometric pattern that is present in a wireless signal emitted by a device may be identified. The biometric pattern may be influenced by one or more user characteristics (e.g., user's heartbeat, breathing, gait, etc.). An embodiment may then determine whether the detected biometric pattern corresponds to a known biometric pattern of an authorized user and, if a positive determination is made, an embodiment may thereafter authenticate a user and allow them to access a device or content on the device. Such a method may verify a user's identity without utilizing any additional sensors or hardware and may do so without requiring a user to take any explicit authentication steps.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
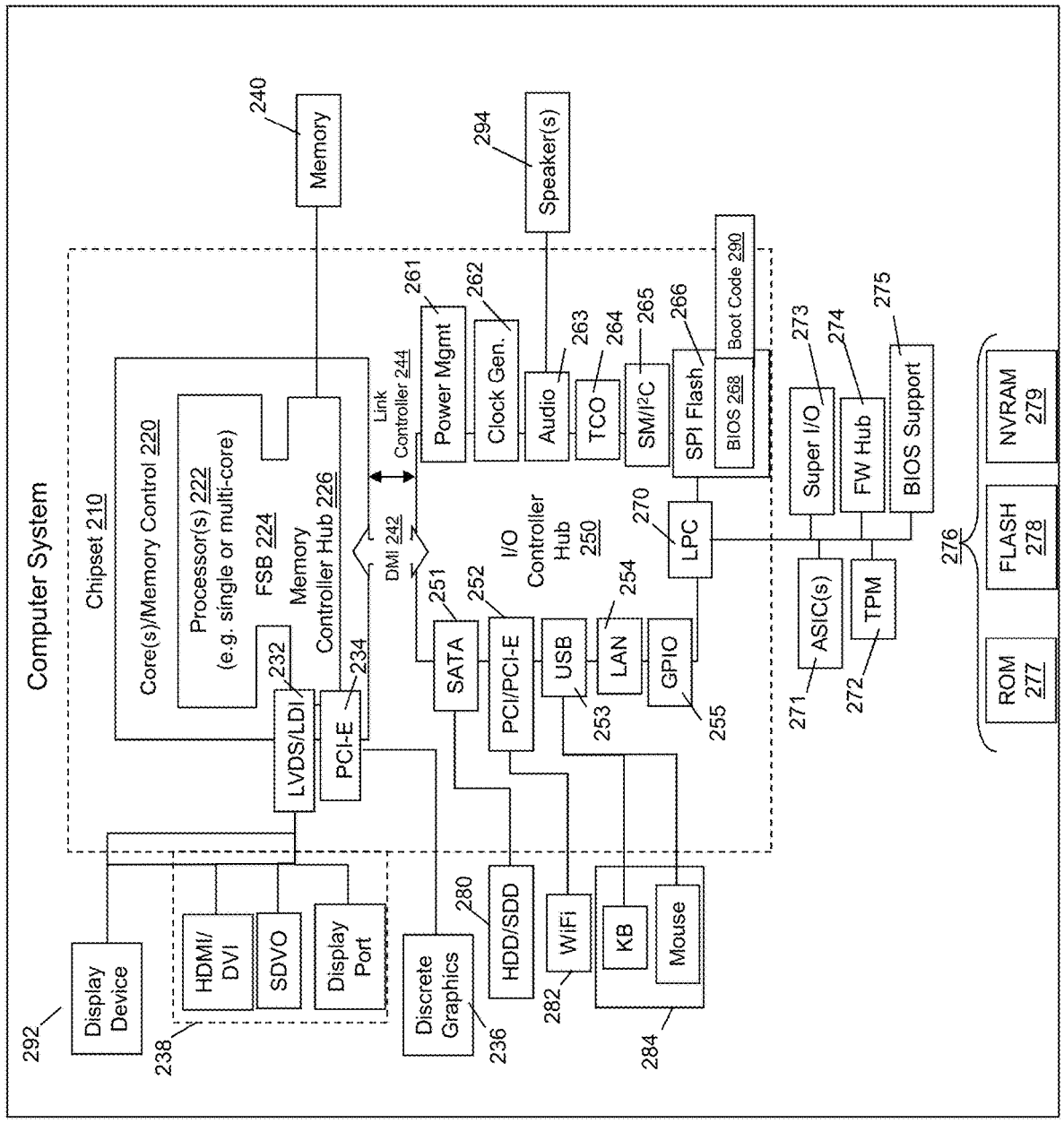
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices capable of emitting a wireless signal. For example, the circuitry outlined in FIG. 1 may be implemented in a smart phone or tablet embodiment, whereas the circuitry outlined in FIG. 2 may be implemented in a laptop.

Figure 3:
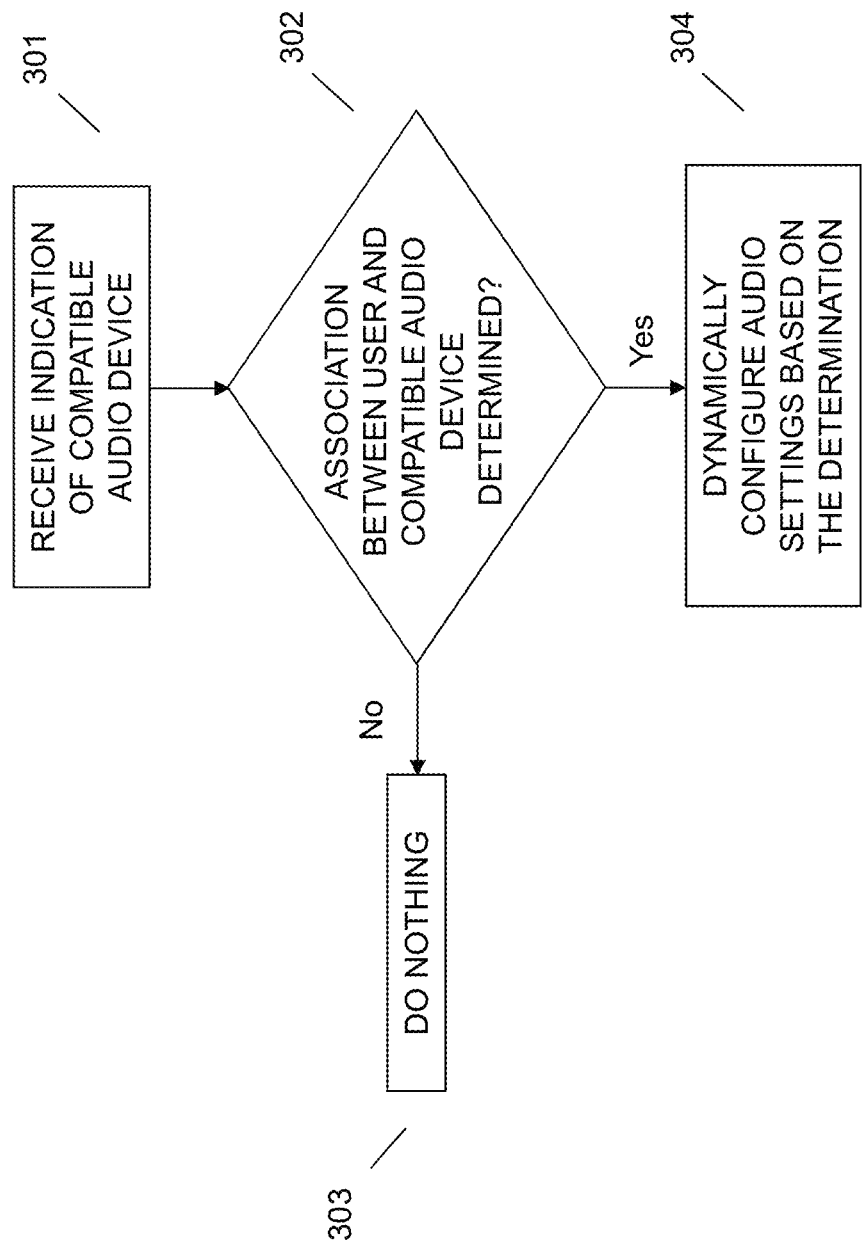
FIG. 3 illustrates an example method of authenticating a user by detecting a biometric pattern in a wireless signal.

Referring now to FIG. 3, a method for authenticating a user by detecting a biometric pattern in a wireless signal is provided. More particularly, embodiments of this application may identify the effects that certain biometric traits naturally output by a user have on a wireless signal and may thereafter utilize this information to verify the user's identity.

At 301, an embodiment may identify a biometric pattern that is present in a wireless signal associated with a device.

In the context of this application, a wireless signal may refer to a signal associated with wireless network technology (e.g., Wi-Fi, etc.) that may be used by devices to interface with the Internet. Wi-Fi technology utilizes radio waves to provide network connectivity. More particularly, devices are generally equipped with a wireless adapter that may translate data into a radio signal that is thereafter transmitted to one or more other devices (e.g., a router, etc.) via an antenna at certain frequencies (e.g., 2.4 GHz, 5 GHz, etc.). Studies have shown that certain biometrics emitted by a user (e.g., heartrate, breathing, gait, etc.) have a detectable effect on the wireless signal. More particularly, the biometric effects may be represented in the wireless signal as identifiable patterns that embodiments of the underlying application may capture and analyze.

In an embodiment, a system may initiate an enrollment period during which time one or more biometric patterns produced by an authorized user's biometrics are detected and recorded (e.g., in a user profile, etc.). The enrollment period may be an explicitly defined training phase or, alternatively, may be a more subtle process in which the biometric patterns produced by the user's natural interactions with their device may be detected and stored over a predetermined period of time (e.g., one minute, one hour, one day, one week, etc.). In an embodiment, multiple enrollment periods may occur over time in an attempt to maintain an accurate accounting of the authorized user's most relevant biometric patterns. For example, an embodiment may require a user to engage in an enrollment period once per year.

In an embodiment, the wireless signal data may be embodied in the channel state information ("CSI") (i.e., the channel properties of a communication link that identify the state of the communication link from the transmit source to the receiver source) associated with the Wi-Fi device(s). Once collected, the system may analyze this data to determine whether any identifiable patterns exist. An embodiment may make this determination based upon reference to a knowledge source (e.g., a database having reference patterns that is stored locally on the device, stored remotely on another device or server, etc.). Responsive to determining that at least one pattern does exist, an embodiment may apply one or more signal processing techniques known in the art to mitigate the effects caused by environmental radio interference. In an optional embodiment, the filtered CSI samples may further be analyzed by a subcarrier selector to determine the most sensitive subcarrier that is most significantly impacted by the biometrics based at least in part on the periodicity and sensitivity. Biometric segmentation and feature extraction are then performed on the filtered CSI samples and the derived features are thereafter either stored in the aforementioned user profile or are compared against biometric patterns in an authorized user's profile, as further described herein.

At 302, an embodiment may determine whether any detected biometric pattern corresponds to an authorized biometric pattern. In the context of this application, an authorized biometric pattern refers to a biometric pattern associated with an authorized user. In an embodiment, the wireless signal data described in 301 may be collected at predetermined intervals or may be collected substantially continuously. For simplicity purposes, the remaining disclosure will be described with respect to continuous wireless signal data collection. Additionally, it is important to note that the determination process described in reference to step 302 is conducted without utilization of any sensors or hardware and does not require any specific intentional user action.

Figure 4:
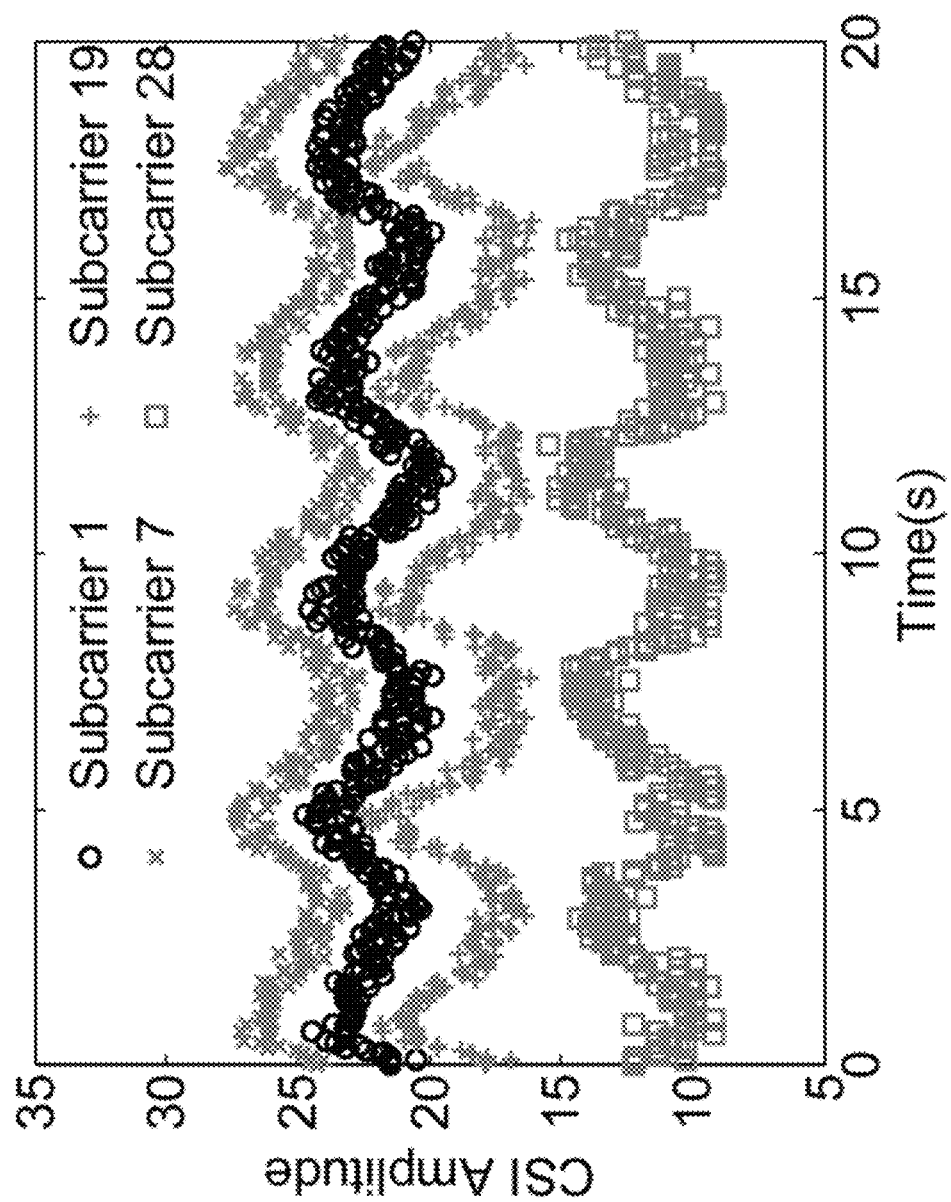
FIG. 4 provides a graph displaying amplitudes of four subcarriers of a wireless signal according to an embodiment.

Upon collection of the wireless signal data and identification of a biometric pattern, an embodiment may compare the identified biometric pattern against an authorized biometric pattern. More particularly, an embodiment may compare one or more characteristics of the identified biometric pattern against one or more characteristics of an authorized biometric pattern. For example, referring now to FIG. 4, a diagram is provided that identifies the CSI amplitudes of four subcarriers (1, 7, 19, and 28) of a particular wireless signal over time when an individual is present. In this figure, it can be observed that the CSI amplitudes of these four subcarriers exhibit an obvious periodic up-and-down trend, which may be influenced by a biometric characteristic of a user (e.g., their breathing, etc.). In an embodiment, the characteristic pattern of all four of these subcarriers may be compared against the patterns of the same four subcarriers in the authorized biometric pattern. Alternatively, the characteristic pattern of a subset of the subcarriers may be compared against the same subset in the authorized biometric pattern. In an embodiment, the two sets of patterns may be compared to determine whether a predetermined level of similarity is present (e.g., 75 percent similarity, 90 percent similarity, etc.). If such a predetermined level of similarity exists, an embodiment may conclude that a match exists.

Responsive to determining, at 302, that the detected biometric pattern does not correspond to an authorized biometric pattern, an embodiment may, at 303, deny a user access to certain content. For example, an embodiment may deny a user access to a device, an application on a device, or to another service that can only be accessed by an authorized user (e.g., a website, etc.). Additionally, an embodiment may provide a user with a notification informing them that they were denied access to their desired content. Conversely, responsive to determining, at 302, that the detected biometric pattern does correspond to an authorized biometric pattern, an embodiment may, at 304, authenticate the user. Thereafter, an embodiment may grant the authenticated user access to their desired content.

The various embodiments described herein thus represent a technical improvement to conventional methods for authenticating a user. Using the techniques described herein, an embodiment may identify a biometric pattern within a wireless signal associated with a device. One or more characteristics of this biometric pattern may then be compared against one or more characteristics of an authorized biometric pattern. If a match between the two sets of biometric patterns exists, an embodiment may conclude that a match exists and may thereafter authenticate a user and grant them access to desired content on the device. Such a method may perform an accurate authentication process without the need for one or more expensive biometric sensing components that are conventionally integrated within devices.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    identifying a biometric pattern present in a wireless signal associated with an information handling device, wherein the biometric pattern corresponds to channel state information amplitude of at least one subcarrier of the wireless signal identified from channel state information of the wireless signal;
    determining, using a processor, whether the biometric pattern corresponds to an authorized biometric pattern, wherein the determining comprises filtering, via signal processing, environmental radio interference out of the channel state information, utilizing a subcarrier selector to identify a most sensitive subcarrier from the at least one subcarrier in the filtered channel state information, and extracting, from the most sensitive subcarrier, at least one feature; and
    authenticating, responsive to determining that the biometric pattern corresponds to the authorized biometric pattern, a user of the information handling device.

2. The method of claim 1, wherein the biometric pattern is influenced by a biometric characteristic associated with the user.

3. The method of claim 2, wherein the biometric characteristic is selected from the group consisting of: breathing data, ambulatory data, and heartbeat data.

4. The method of claim 1, wherein the identifying comprises:
    continuously collecting the channel state information of the wireless signal; and
    identifying, within the channel state information, the channel state information amplitude of the at least one subcarrier.

5. The method of claim 1, wherein the determining comprises determining without utilization of a sensor.

6. The method of claim 1, wherein the authorized biometric pattern is contained in a user profile associated with the user.

7. The method of claim 1, wherein the authorized biometric pattern is associated with an authorized user.

8. An information handling device, comprising:
    a processor;
    a memory device that stores instructions executable by the processor to:
    identify a biometric pattern present in a wireless signal associated with the information handling device, wherein the biometric pattern corresponds to channel state information amplitude of at least one subcarrier of the wireless signal identified from channel state information of the wireless signal;
    determine whether the biometric pattern corresponds to an authorized biometric pattern, wherein the determining comprises filtering, via signal processing, environmental radio interference out of the channel state information, utilizing a subcarrier selector to identify a most sensitive subcarrier from the at least one subcarrier in the filtered channel state information, and extracting, from the most sensitive subcarrier, at least one feature; and
    authenticate, responsive to determining that the biometric pattern corresponds to the authorized biometric pattern, a user of the information handling device.

9. The information handling device of claim 8, wherein the biometric pattern is influenced by a biometric characteristic associated with the user.

10. The information handling device of claim 9, wherein the biometric characteristic is selected from the group consisting of: breathing data, ambulatory data, and heartbeat data.

11. The information handling device of claim 8, wherein the instructions executable by the processor to identify comprise instructions executable by the processor to:

continuously collect the channel state information of the wireless signal; and identify, within the channel state information, the channel state information amplitude of the at least one subcarrier.

12. The information handling device of claim 8, wherein the instructions executable by the processor to determine comprise instructions executable by the processor to determine without utilization of a sensor.

13. The information handling device of claim 8, wherein the authorized biometric pattern is contained in a user profile associated with the user.

14. A product, comprising:

a storage device that stores code, the code being executable by a processor and comprising:

code that identifies a biometric pattern present in a wireless signal associated with an information handling device, wherein the biometric pattern corresponds to channel state information amplitude of at least one subcarrier of the wireless signal identified from channel state information of the wireless signal;

code that determines whether the biometric pattern corresponds to an authorized biometric pattern, wherein the determining comprises filtering, via signal processing, environmental radio interference out of the channel state information, utilizing a subcarrier selector to identify a most sensitive subcarrier from the at least one subcarrier in the filtered channel state information, and extracting, from the most sensitive subcarrier, at least one feature; and code that authenticates, responsive to determining that the biometric pattern corresponds to the authorized biometric pattern, a user of the information handling device.

* * * * *